United States Patent
Yeh (12)

(10) Patent No.: US 6,636,184 B1
(45) Date of Patent: Oct. 21, 2003

(54) ANTENNA LAYOUT AND COORDINATE POSITIONING METHOD FOR ELECTROMAGNETIC-INDUCTION SYSTEMS

(75) Inventor: Chia-Jui Yeh, Taipei (TW)

(73) Assignee: Aiptek International Inc., Hsin-Chu (TW)

(*) Notice: Subject to any disclaimer, the term of this patent is extended or adjusted under 35 U.S.C. 154(b) by 0 days.

(21) Appl. No.: 10/135,519

(22) Filed: May 1, 2002

(51) Int. Cl.[7] .......................... H01Q 9/00; G06K 11/16
(52) U.S. Cl. ................ 343/867; 178/18.07; 178/18.03; 340/525.69
(58) Field of Search .................. 343/867, 866, 343/741, 742, 702; 178/18.07, 18.03; 340/825.69; H01Q 9/00; G06K 11/16

(56) References Cited

U.S. PATENT DOCUMENTS

| | | | |
|---|---|---|---|
| 4,760,394 A | * | 7/1988 | Takeuchi et al. ....... 340/825.54 |
| 5,134,392 A | * | 7/1992 | Takeuchi et al. ....... 340/825.69 |
| 6,194,993 B1 | * | 2/2001 | Hayashi et al. .......... 340/10.34 |

| | | | |
|---|---|---|---|
| 2003/0079921 A1 | * | 5/2003 | Yeh .................. 178/18.07 |

* cited by examiner

*Primary Examiner*—Hoanganh Le
(74) *Attorney, Agent, or Firm*—Rosenberg, Klein & Lee

(57) ABSTRACT

A 4-4 distribution antenna layout and a five-stage coordinate positioning method of electromagnetic induction systems being provided by the present invention is disclosed. The 4-4 distribution antenna layout of the present invention divides antenna circuitries into x-axis and y-axis groups. The antenna circuitries within the same group are in equal distance displacements and in the same direction, which further comprise a plurality of antenna loops. The formation of each antenna loop comprises a dense multiple duplicate self-looping method. Moreover, the five-stage coordinate positioning method of electromagnetic induction systems comprising, first, carrying out a first procedure to confirm any signal with voltage amplitude greater than a standard minimum signal recognition value. Second, carrying out a second procedure to confirm signal existence of the previous scan as well as to confirm the nearest antenna loop to the transmission source. Third, carrying out a third procedure to obtain coordinate values. And, finally, using an internal micro-processing sub-circuitry of the electromagnetic-induction system to calculate an absolute coordinate.

59 Claims, 9 Drawing Sheets

ANTENNA LAYOUT AND COORDINATE POSITIONING METHOD FOR ELECTROMAGNETIC-INDUCTION SYSTEMS

BACKGROUND OF THE INVENTION

1. Field of the Invention

The present invention relates generally to an electromagnetic-induction system, and more particularly, relates an antenna layout and its coordinate positioning method of the electromagnetic-induction system.

2. Description of the Prior Art

Because a handwriting recognition system could replace the mouse, and is more suitable than the mouse to let the user input words and patterns by user's hands, improvement of the handwriting recognition system is a hot and important field of current computer technology. The original intention of the handwriting recognition system is to replace the mouse. As usual, to enhance the user's convenience, a handwriting recognition system would usually replace the mouse by both wireless pen and tablet. Herein, the pen nib of the wireless pen usually corresponds to the left button of the mouse. Conventional handwriting recognition systems have been developed for many years, but these products are applied to perform only one function, such as drawing or inputting a word.

In the conventional electromagnetic-induction systems, there are usually a digitizer tablet and a transducer/cursor in the form of a pen or a puck. As is well known, there are two operation modes for determining the position of a pointing device on the surface of a digitizer tablet, wherein one is a relative mode, and the other is an absolute mode. A mouse device operates in a relative mode. The computer sensing the inputs from a mouse recognizes only relative movements of the mouse in X and Y directions as it is slid over the surface on which it is resting. If the mouse is lifted and repositioned on the surface, no change in the signal to the computer will be detected. A common approach uses a sensing apparatus inside the mouse to develop a pair of changing signals corresponding to the longitudinal and transversal movements of the mouse. On the contrary, a cursor device in a digitizer tablet system, such as electromagnetic-induction pen, operates in an absolute mode. If a cursor device is lifted and moved to a new position on its supporting surface, its signal to a computer will change to reflect the new absolute position of the cursor device. Nowadays, various methods have been used to determine the position of a cursor device on the surface of its supporting tablet, wherein one common skill which is applied for the absolute mode is electromagnetic field sensing.

Early transducer/cursors were connected to the tablet by means of a multi-conductor cable through which the position and button/pressure information are transferred virtually without any problem. The cordless transducer/cursors in some of the prior arts have attempted to use frequency and/or phase changes to transmit the non-positional status of the transducer/cursor functions such as buttons pushed, pen pressure, or the like. However, if there is no sophisticated processing, frequency and phase changes are very prone to false reading resulting from several outside factors such as metal objects, noise, wireless electromagnetic wave and so on. These problems become more apparent, especially in a larger digitizer tablet. Improvements have also been made in the prior arts to allow a, user to use pointing devices on a digitizer tablet system in dual modes of operation that can provide information of either a relative movement or an absolute position under the control of the user.

Usually, a handwriting recognition system is a device with cordless pressure-sensitivity and electromagnetic-induction. Refer to FIG. 1, it shows a circuit block diagram of a conventional cordless pressure-sensitive and electromagnetic-induction device. Conventional cordless pressure-sensitivity and electromagnetic-induction device comprises: an electromagnetic-induction pen and a tablet. There is an oscillating circuit that consists of LC in the electromagnetic-induction pen. If the pen point is touched, the amount of inductance will be changed that results in the variation of oscillating frequency. The amount of inductance is increased when touching the pen point and increasing pressure so the variation of oscillating frequency is also increased. Therefore, the variation of the pressure on the pen point can be detected by way of the variation of oscillating frequency. There are two switches on the sidewall of the electromagnetic-induction pen, the emitted frequency of the electromagnetic-induction pen can be changed with the capacitance variation of the LC device that is produced by pushing down or setting free the switches. Furthermore, the tablet comprises a detector, -an amplifier and an analog-digital converter. In the conventional tablet, there is a detected loop in the center region of the tablet, with one-way antennas located on the double faces of the detected loop, wherein the one-way antennas are equidistantly arranged in order by way of using array. The main purpose of the one-way detected loop is only applied to receive the electromagnetic wave that is emitted by the electromagnetic-induction pen. When the electromagnetic-induction pen emits the electromagnetic wave, the one-way antennas receive the electromagnetic wave, and then the tablet can obtain correlative information by the electromagnetic induction.

Therefore, for those conventional antenna layout and signal detection methods, the obtained coordinate accuracy is normally low, hence reduces CPU efficiency and the return rate. Thus, an improvement in coordinate accuracy is still one of the most crucial goals of development in the industry.

In accordance with the above description, the present invention provides an antenna layout and its coordinate positioning method for electromagnetic induction systems, so as to increase the coordinate positioning accuracy and strengthen the efficiency of electromagnetic induction systems.

SUMMARY OF THE INVENTION

In accordance with the above description of the prior art, the present invention provides an antenna layout and its coordinate positioning method of electromagnetic-induction systems for improving the coordinate accuracy and the efficiency of the conventional electromagnetic induction systems.

An object of the present invention is to provide a coordinate positioning procedure of the electromagnetic-induction system. The present invention uses a five-stage coordinate positioning method to increase the coordinate positioning accuracy and to speed up the coordinate return rate. Thus, the present invention satisfies the industrial utility.

Another object of the present invention is to provide a five-stage coordinate positioning method of the electromagnetic-induction system. The present invention uses a coordinate calculation formula to ensure a highly accurate coordinate calculation. Hence, the present invention can reduce CPU processing time, as well as can avoid the problem of line defect when using hand-writing input, thus, can strengthen the electromagnetic induction system efficiency.

A further object of the present invention is to provide an antenna layout of the electromagnetic-induction system. The present invention uses a 4-4 distribution antenna layout the antenna layout density. Therefore, the present invention can reduce the area of printed circuit boards, thus, reducing the production time and achieving the product size reduction target. Hence, the present invention satisfies an economical efficiency.

In accordance with the above description of the objects, the present invention discloses a 4-4 distribution antenna layout and a five-stage coordinate positioning method of the electromagnetic-induction system. The 4-4 distribution antenna layout of the present invention distributes the electromagnetic induction system's induction antennas on both sides of the printed circuit board in a equal space manner and uses two-dimension array method to form an antenna circuitry for obtaining a clearer signal when the electromagnetic field changes.

The antenna circuitries are divided into x-axis and y-axis groups. The antenna circuitries within the same group are in equal distance displacements and in the same direction, and further comprise a plurality of antenna loops. In order to allocate the antenna circuitries uniformly and to reduce the antenna layout density, each antenna ||rcuitry within the same direction group comprises a plurality of antenna loops. For example, an antenna circuitry consisted of four antenna loops, only three of the antenna loops surround the transmission source when a signal transmission source is placed directly above the prime region of the antenna loops. The formation of each antenna loop comprises a dense multiple duplicate self-looping method. Therefore, when the electromagnetic field changes, an antenna with more loops can induce a stronger induction signal.

Moreover, the five-stage coordinate positioning method of electromagnetic induction systems comprising, first, carrying out a first procedure, the universal scanning procedure, to confirm any signal with voltage amplitude greater than a standard minimum signal recognition value. Second, carrying out a second procedure, the mid-terrain confirmation scanning procedure, to confirm signal existence of the previous scan as well as to confirm the nearest antenna loop to the transmission source. Third, carrying out a third procedure, -a partial confirmation scanning procedure, to obtain coordinate values. And, final, using an internal micro-processing sub-circuitry of the electromagnetic-induction system to calculate an absolute coordinate.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
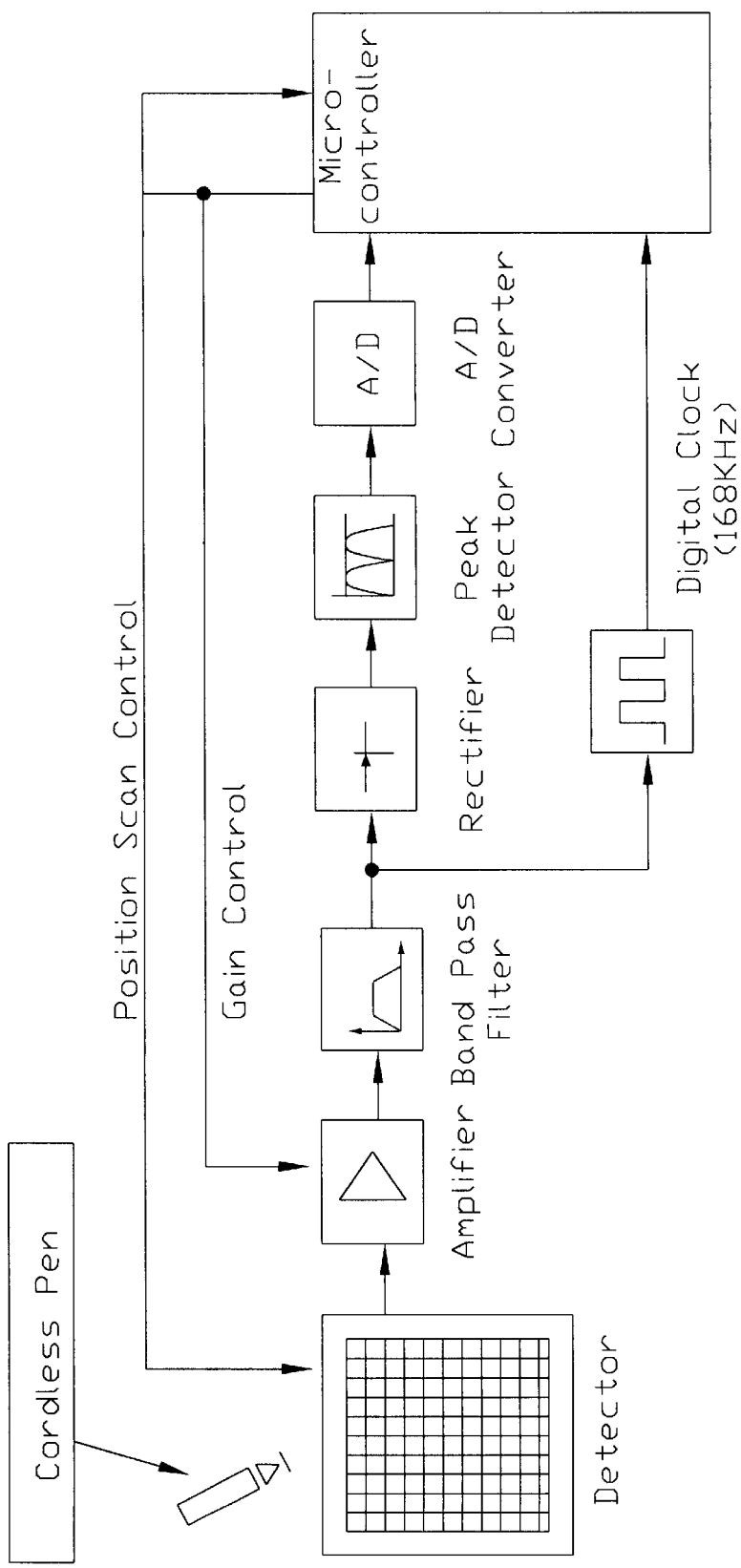
FIG. 1 depicts a circuit block diagram of a conventional electromagnetic induction system.

Some sample embodiments of the present invention will now be described in greater detail. Nevertheless, it should be recognized that the present invention can be practiced in a wide range of other embodiments besides those explicitly described, and the scope of the present invention is expressly not limited except as specified in the accompanying claims.

As illustrated in FIG. 2, in a preferred embodiment of the present invention, first of all, providing an electromagnetic induction system 200. The electromagnetic induction system 200 comprises an antenna sub-circuitry 205, an internal circuitry 210 and a micro-processing sub-circuitry 215. Wherein, the internal circuitry 210 comprises a filter sub-circuitry, an amplifier sub-circuitry, a rectifier sub-circuitry, and a digital-to-analog converter sub-circuitry. The micro-processing sub-circuitry 215 comprises a plurality of temporary storages 225, and can internally define and store a voltage reference value. This voltage reference value is the standard minimum signal recognition value, which is used to distinguish whether the received signal is a noise or not. Moreover, the standard minimum signal recognition value is defined as the largest voltage amplitude of noises received by the electromagnetic induction system's 200 antennas when there is no any noticeable transmission source around the electromagnetic induction system 200. Therefore, the standard minimum signal recognition value is greater than ordinary noise voltage. Hence, the micro-processing sub-circuitry 215 within the electromagnetic induction system 200 only require to do a regular time basis check on the received voltage values whether or not greater than the standard minimum signal recognition value. If a received voltage value is greater than the standard minimum signal recognition value then one can conclude that there is a signal transmission source nearby the electromagnetic induction system 200. Normally, the electromagnetic induction has a characteristic of electromagnetic signal to be inverse proportional to distance square. That is, in the view of the receiving end, when the transmission source is far away from the receiving antenna the signal voltage amplitude will be smaller than the noise voltage amplitude. And when the transmission source is close to the receiving antenna the signal voltage amplitude will be greater than the noise voltage amplitude.

Figure 2A:
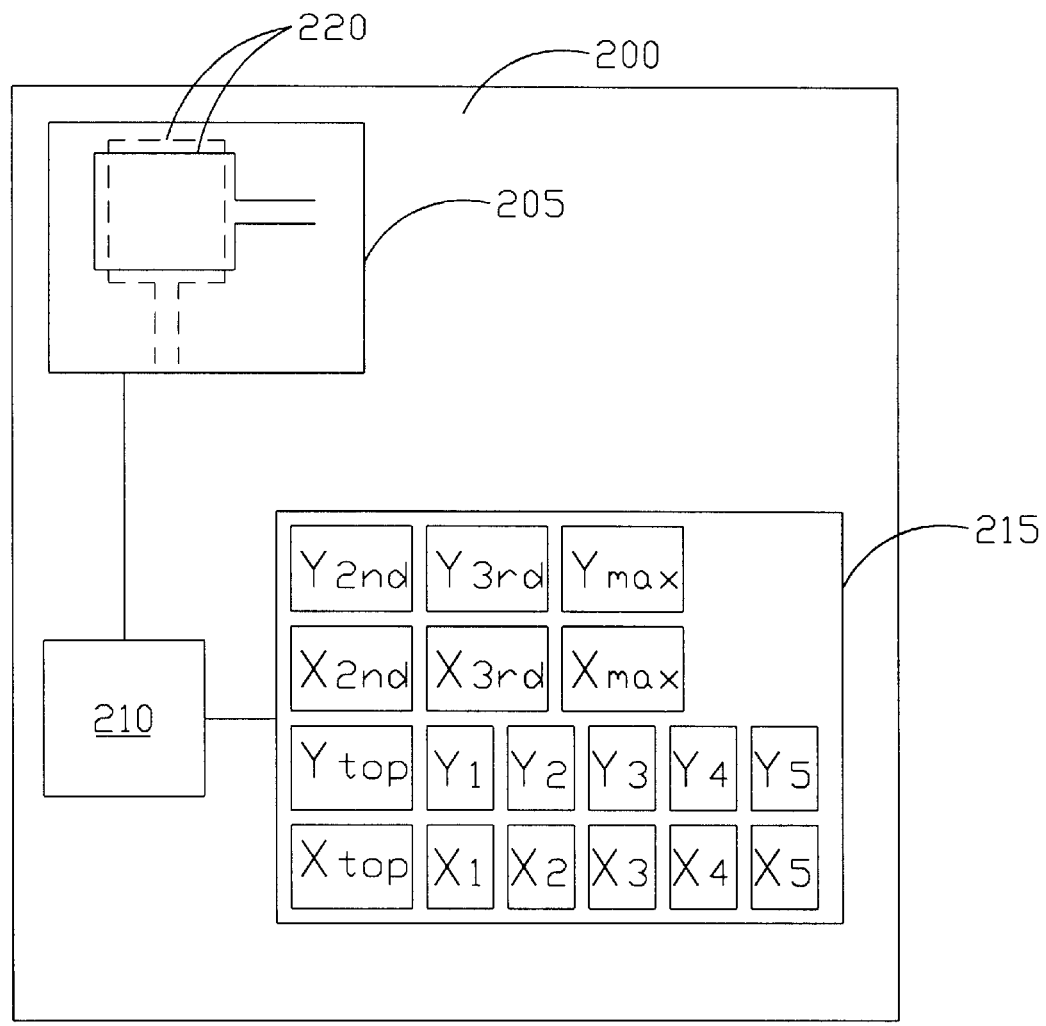
FIG. 2A depicts a simplified circuit block diagram of an electromagnetic induction system of a preferred embodiment of the present invention.
Figure 2B:
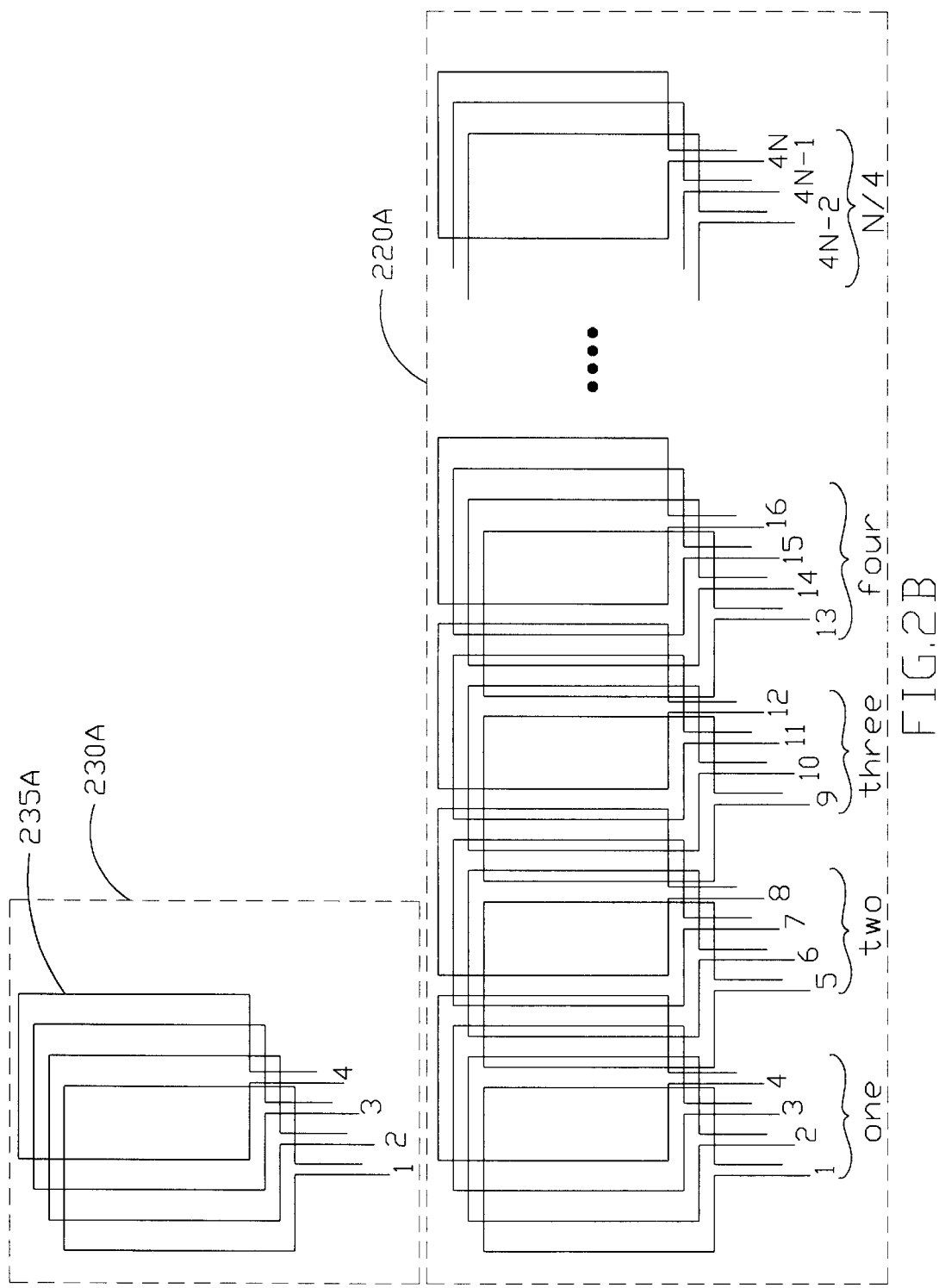
FIG. 2B depicts a x-axis antenna layout diagram of the electromagnetic induction system of the preferred embodiment of the present invention.
Figure 2C:
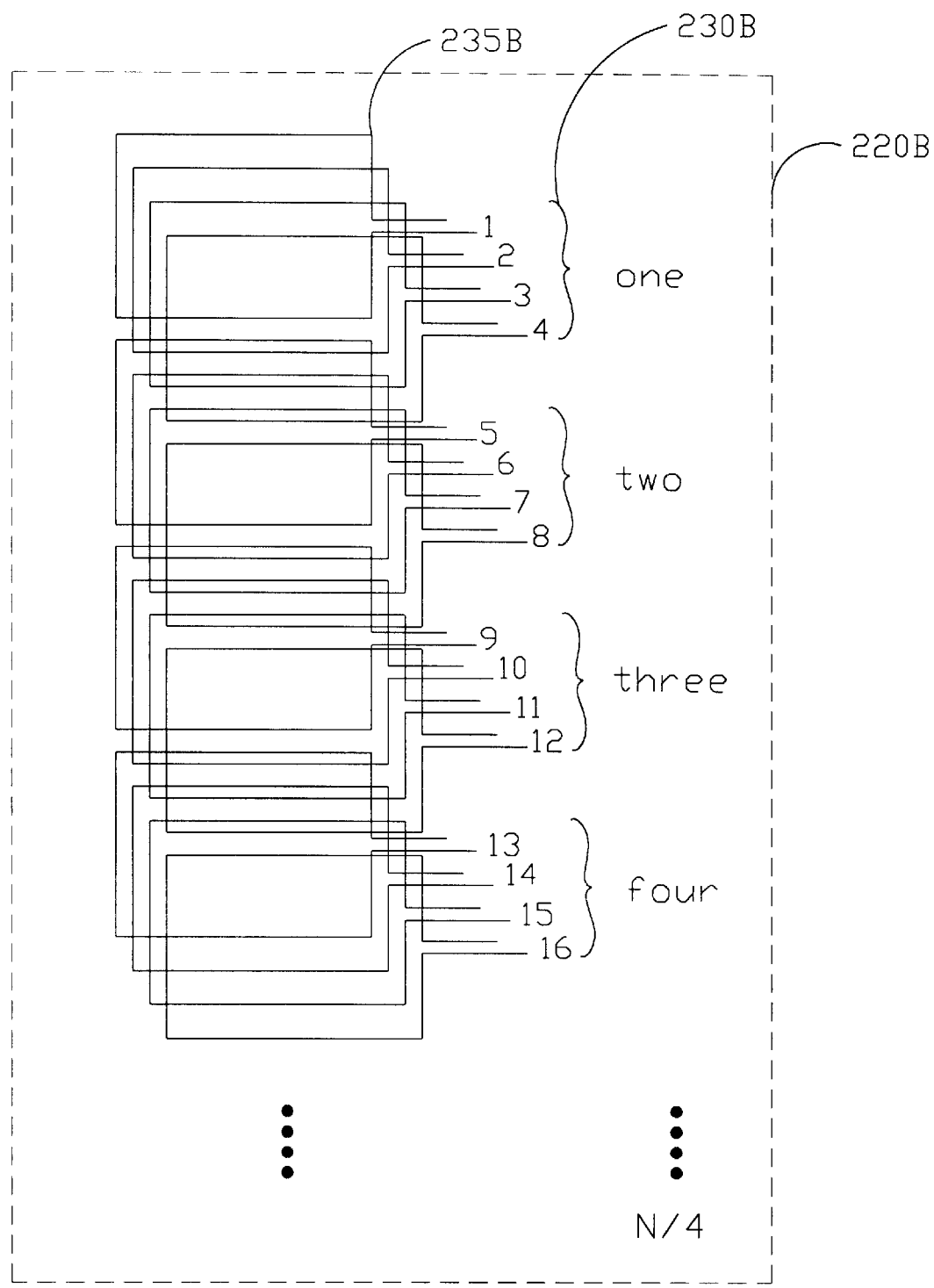
FIG. 2C depicts a y-axis antenna layout diagram of the electromagnetic induction system of the preferred embodiment of the present invention.
Figure 2D:
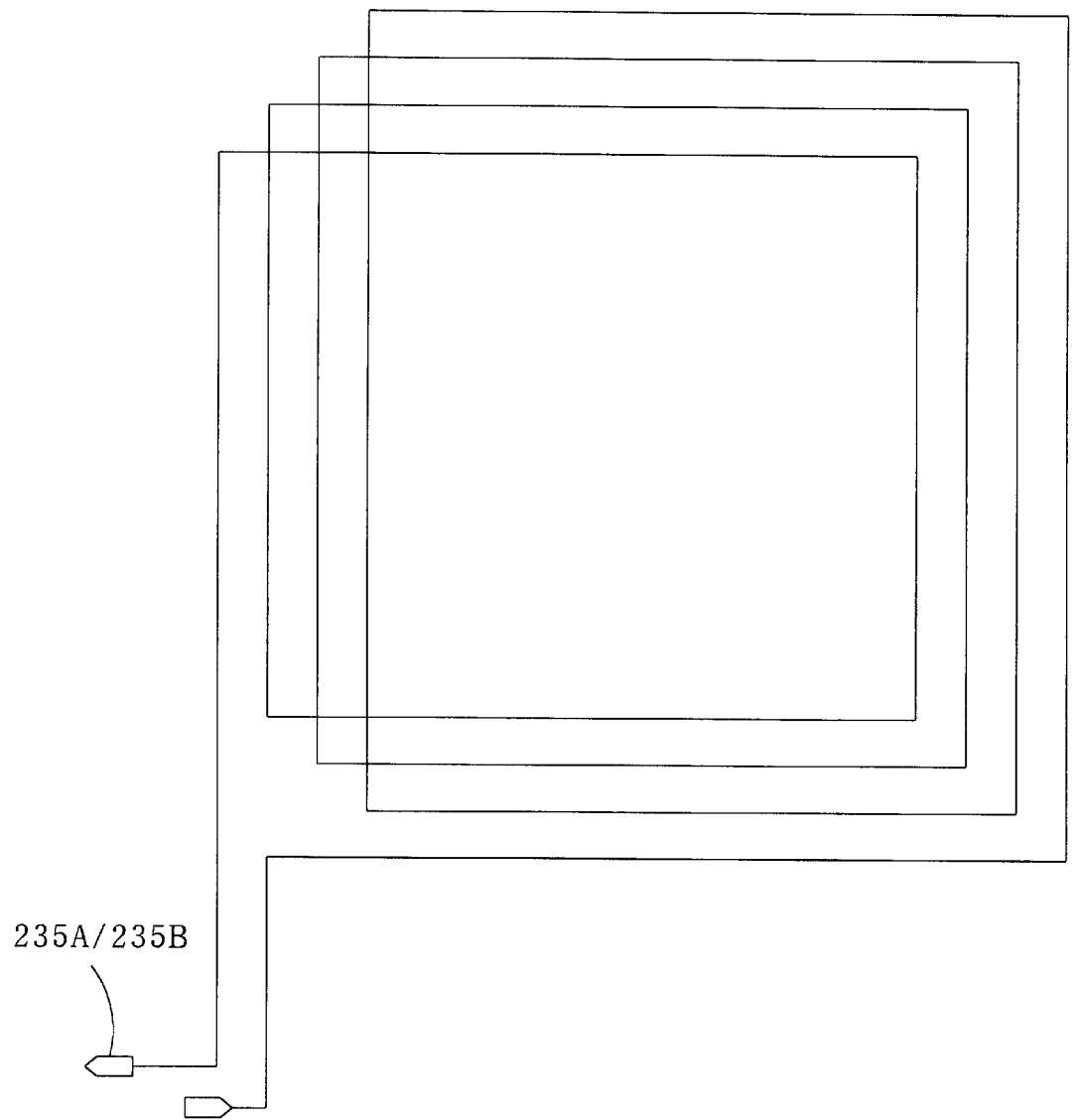
FIG. 2D depicts a structural diagram of an antenna looping formed by the antenna layout of the electromagnetic induction system of the preferred embodiment of the present invention.

Referring now to FIGS. 2B and 2C, in the preferred embodiment of the present invention, the antenna sub-circuitry 205 of the electromagnetic induction system 200 comprises a 4-4 distribution antenna layout, wherein the antenna layout method of the 4-4 distribution antenna layout can be a two-dimensional array allocation method and the two-dimensional Cartesian coordinates can be applied to the coordinate positions. For example, The 4-4 distribution antenna layout of the present invention uses the two-dimension array method to distribute a plurality of different direction antenna groups 220 on both sides of a printed circuit board in a equal space manner for obtaining a clearer signal when the electromagnetic field changes. Moreover, a plurality of antennas of the antenna sub-circuitry 205 further comprises looping-type inductors and the material of looping-type inductors comprises copper foil conducting wire. In accordance with the two-dimensional Cartesian coordinates, the plurality of different direction antenna groups 220 comprises an x-axis antenna group 220A and a y-axis antenna group 220B. Wherein, the allocation of antenna circuitries 230A and 230B of antenna group 220A and 220B is in equal distance displacements and in the same direction. Moreover, the x-axis antenna group 220A and the y-axis antenna group 220B each comprises N/4 x-axis antenna circuitries 230A and M/4 y-axis antenna circuitries 230B. Furthermore, each x-axis antenna circuitry and y-axis antenna circuitry includes four antenna loops 235A and 235B respectively for uniformly distributing the antenna loops on both sides of the printed circuit board. Therefore, the total number of antenna loops 235A of the N/4 x-axis antenna circuitries 230A is N, and the total number of antenna loops 235B of the M/4 y-axis antenna circuitries 230B is M. For equal direction antenna loops 235A or 235B, only three of the antenna loops 235A or 235B surround the transmission source when a signal transmission source is placed directly above the prime region of an antenna loop 235A or 235B. Apart from that, each antenna loop 235A and 235B further comprises a multiple looping induction antenna and the formation of it comprises a dense multiple duplicate self-looping method. Therefore, when the electromagnetic field changes, an antenna with more loops can induce a stronger induction signal, as what is shown in FIG. D.

Figure 2E:
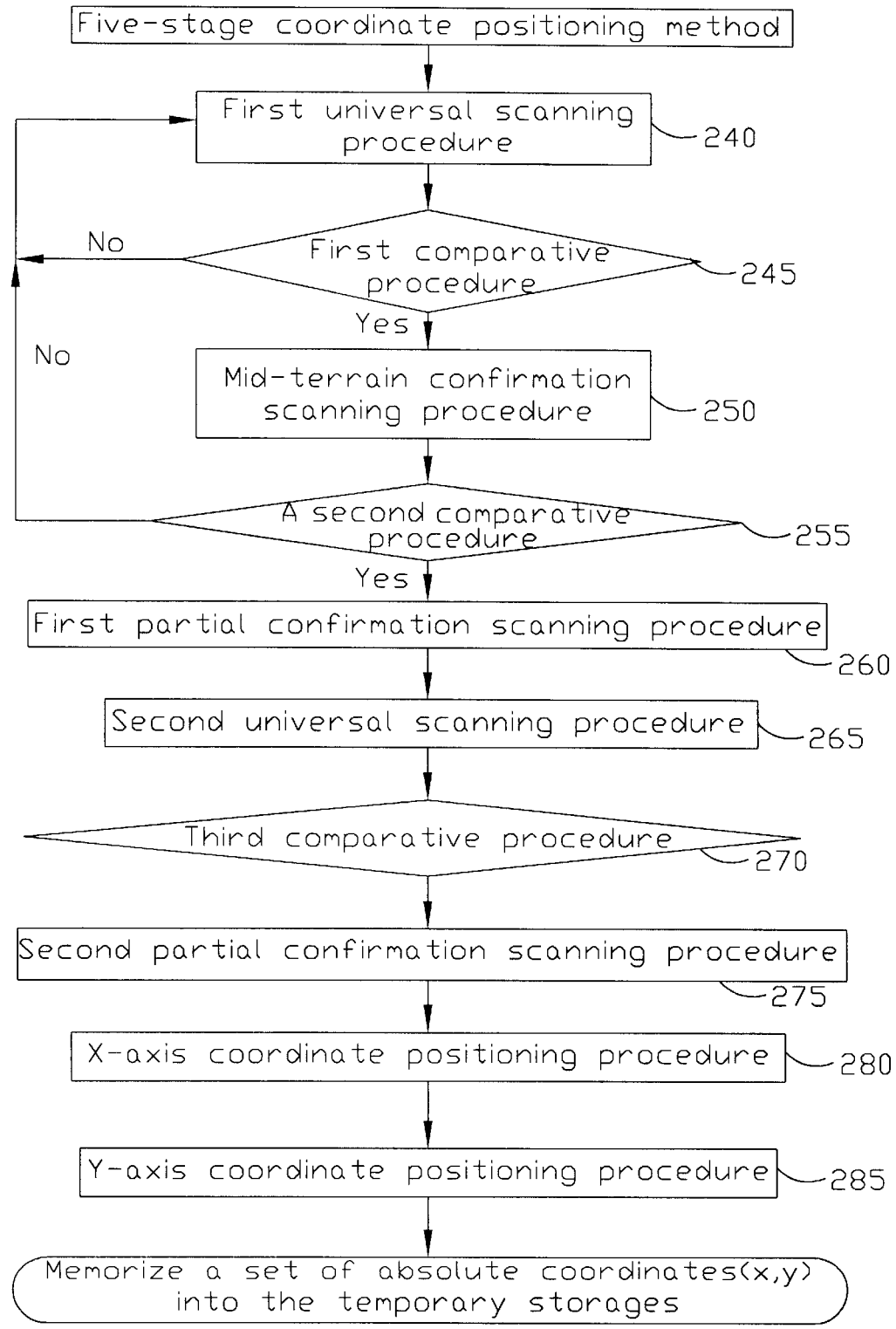
FIG. 2E depicts a flowchart of a coordinate positioning method of the electromagnetic induction system of the preferred embodiment of the present invention.

Referring now to FIG. 2E, in the preferred embodiment of the present invention and in accordance with the two-dimensional Cartesian coordinates, the coordinate positioning method being carried out by the electromagnetic induction system 200 of the present invention comprises a five-stage coordinate positioning method. The five-stage coordinate positioning method includes, first, carrying out a first universal scanning procedure 240 on the x-axis antenna group 220A for confirming the positions of the antenna loops with signal amplitudes greater than the standard minimum signal recognition value. The first universal scanning procedure 240 scans N antenna loops 235A within the x-axis antenna group 220A on a time-division basis method. The time-division basis method activates one antenna loop at a time and keep the remaining antenna loops deactivated or open-circuited. When the first antenna loop is activated, the largest voltage amplitude of the received signals of the first antenna loop is obtained through the internal circuitry 210. The largest voltage amplitude of the received signals is then transferred to the micro-processing sub-circuitry 215 to proceed a first comparative procedure 245 for comparing the largest voltage amplitude of the received signals of the first antenna loop to a standard minimum signal recognition value. Each antenna loop is then activated sequentially with the first universal scanning procedure 240 and the first, comparative procedure 245 being repeated until N antenna loops 235A within the x-axis antenna group 220A all being activated once and N signal voltage amplitudes being obtained. The antenna loop label $X_p$ of the largest voltage amplitude greater than the standard minimum signal recognition value is then recorded in a temporary storage $X_{top}$. If there is no antenna loop signal amplitude greater than the standard minimum signal recognition value then repeat the first universal scanning procedure 240 and the first comparative procedure 245 until there is an antenna loop signal amplitude greater than the standard minimum signal recognition value.

Figure 2F:
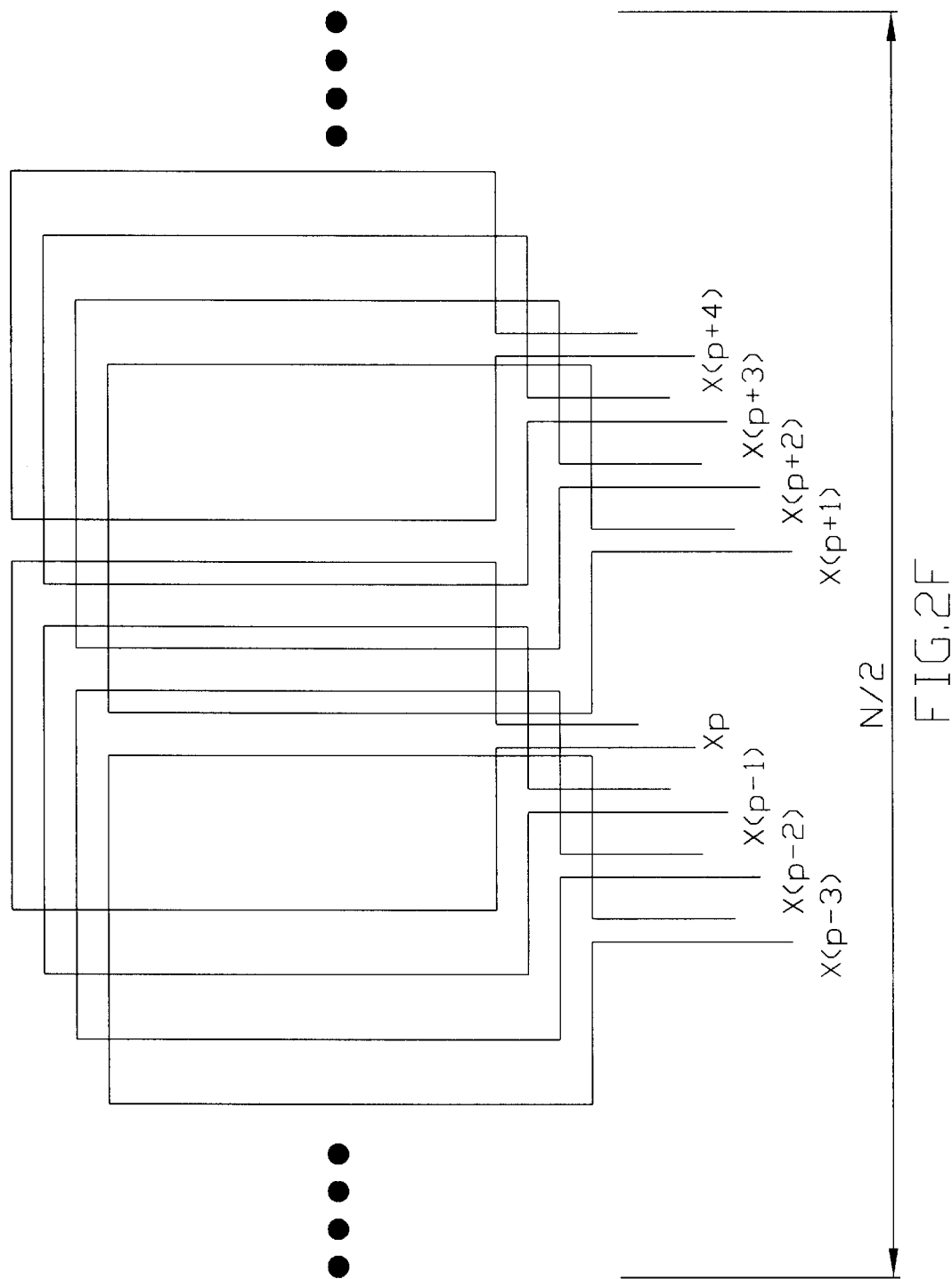
FIG. 2F depicts a mid-terrain confirmation scanning procedure of the coordinate positioning method of the electromagnetic induction system of the preferred embodiment of the present invention.

Referring now to FIGS. 2E and 2F, in the preferred embodiment of the present invention, carrying out a mid-terrain confirmation scanning procedure 250 for confirming the existence of the signal having the largest voltage amplitude from the previous scan on the x-axis antenna group 220A, as well as finding out the closest antenna loop to the transmission source. This can avoid the detection of a sudden noise spike as the largest a signal voltage amplitude. The mid-terrain confirmation scanning procedure 250 comprises: first, the micro-processing sub-circuitry 215 takes out the antenna loop label $X_p$ from the temporary storage $X_{top}$ and defines the antenna loop label $X_p$ as the mid-terrain scanning basis. Second, taking the antenna loop label $X_p$ as the center and re-scan a half of the antenna loops including the antenna loop label $X_p$ within the x-axis antenna group 220A, that is, N/2 antennas. Third, after obtaining N/2 signal amplitudes of N/2 antenna loops within the x-axis antenna group 220A, transferring N/2 signal amplitudes to the micro-processing sub-circuitry 215 to proceed a second comparative procedure 255 for comparing the largest voltage amplitude of the N/2 signals to the standard minimum signal recognition value. If there is another antenna loop having the signal voltage amplitude greater than the standard minimum signal recognition value then update the antenna loop label in the temporary storage $X_{top}$. Contrary, If there is no antenna loop having signal voltage amplitude greater than the standard minimum signal recognition value then repeat the first universal scanning procedure 240 and the first comparative procedure 245 until there is an antenna loop signal amplitude greater than the standard minimum signal recognition value. Moreover, if p+(N/4) is greater than N or p−(N/4) is less than 1, then the coverage of the mid-terrain confirmation scanning procedure 250 is restricted to the edge of the antenna layout, scanning N/2 antenna loops including the antenna loop $X_p$.

Next, carrying out a first partial confirmation scanning procedure 260 to scan a partial region of the antenna loop $X_p$ having the largest signal amplitude within the x-axis antenna group 220A and to obtain an x-axis coordinate value. The antenna loop label $X_p$ is firstly taken out from the temporary storage $X_{top}$, and from the characteristic of signal being inversely proportional to distance square, one can conclude the closest transmission source to the antenna loop $X_p$, that is, the transmission source is located directly above the antenna loop $X_p$. Another scanning procedure is then carried out, which covers five antenna loops including the antenna loop $X_p$, which is to scan antenna loop $X_{p-2}$, $X_{p-1}$, $X_p$, $X_{p+1}$, and $X_{p+2}$, and to obtain five signal amplitudes. These signal amplitudes are then stored into temporary storage X1, X2, X3, X4, and X5 respectively. After then, carrying out a second universal scanning procedure 265 on the y-axis antenna group 220B for confirming the positions of the antenna loops with signal amplitudes greater than the standard minimum signal recognition value. The second universal scanning procedure 265 is very similar to the first universal scanning procedure 240 which scans M antenna loops 235B within the y-axis antenna group 220B on a time-division basis method. A third comparative procedure 270 is then carried but to compare among M signal amplitudes and to obtain the antenna position of having the largest signal amplitude. The second universal scanning procedure 265 is differ to the first universal scanning procedure 240 by not comparing the M signal amplitudes of M antenna loops 235B to the standard minimum signal recognition value, but rather compare among themselves. The antenna loop label $Y_p$ of having the largest voltage amplitude within M signal amplitudes is then recorded in a temporary storage $Y_{top}$.

Next, carrying out a second partial confirmation scanning procedure 275 to scan a partial region of the antenna loop $Y_p$ of having the largest signal amplitude within the y-axis antenna group 220B and to obtain a y-axis coordinate value. The antenna loop label $Y_p$ is firstly taken out from the temporary storage $Y_{top}$, and from the characteristic of signal being inversely proportional to distance square, one can conclude the closest transmission source to the antenna loop $Y_p$, that is, the transmission source is located directly above the antenna loop $Y_p$. Another scanning procedure is then carried out, which covers five antenna loops including the antenna loop $Y_p$, which is to scan antenna loop $Y_{p-2}$, $Y_{p-1}$, $Y_p$, $Y_{p+1}$, and $Y_{p+2}$, and to obtain five signal amplitudes. These signal amplitudes are then stored into temporary storage Y1, Y2, Y3, Y4, and Y5 respectively.

Referring now to FIG. 2F, in the preferred embodiment of the present invention, once the above procedures are accomplished the amplitude values (X1, X2, X3, X4, and X5) and (Y1, Y2, Y3, Y4, and Y5) being obtained are then used to carry out an x-axis coordinate positioning procedure 280 and a y-axis coordinate positioning procedure 285 respectively for calculating a set of absolute coordinates. Therefore, in according to the largest amplitude being obtained from the first partial confirmation scanning procedure 260 and the second partial confirmation scanning procedure 275, as well as according to the characteristic of signal being inversely proportional to distance square, one can conclude that the two neighboring antenna loops of the largest amplitude antenna loop should have the second and third largest signal amplitudes. Accordingly, the x-axis coordinate positioning procedure 280 comprises: first, carrying out a fourth comparative procedure 280A to compare among the signal amplitudes stored in the temporary storage X1, X2, X3, X4, and X5 and store the largest amplitude into a temporary storage $X_{max}$ and its antenna loop label into temporary storage $X_{top}$. Second, carrying out a first logical judgment procedure 280B to judge the largest amplitude within the voltage amplitudes stored in the temporary storage X1, X2, X3, X4, and X5. If the largest voltage amplitude is stored in temporary storage X1 or X5, then carry out a second logical judgment procedure 280C to find out whether or not the antenna loop position respective to temporary storage X1 or X5 is the first or the $N_{th}$ antenna loop of the x-axis antenna group 220A. If it is, one can conclude that the transmission source is located on the border region 280D of the x-axis antenna group 220A. If it is not, needs to return to the mid-terrain confirmation scanning procedure 250. When the largest voltage amplitude is not stored in temporary storage X1 or X5, then carry out a first data storage procedure 280E for the ease of storing the second and third largest voltage amplitude into temporary storage $X_{2nd}$ and $X_{3rd}$ respectively. For example, the amplitudes of the neighboring two antenna loops $X_{p-1}$ and $X_{p+1}$, of the largest amplitude antenna loop $X_p$ are stored in temporary storage $X_{2nd}$ and $X_{3rd}$ respectively.

Next, by means of the micro-processing sub-circuitry 215 carries out a first calculation procedure 280F which includes: first, subtracting the second largest value $X_{2nd}$ and the third largest value $X_{3rd}$ from the largest value $X_{max}$ separately to obtain a first voltage amplitude difference ($X_{max}-X_{2nd}$) and a second voltage amplitude difference ($X_{max}-X_{3rd}$) Second, taking the sum of the first voltage amplitude difference ($X_{max}-X_{2nd}$) and the second voltage amplitude difference ($X_{max}-X_{3rd}$) as a denominator and the first voltage amplitude difference ($X_{max}-X_{2nd}$) as a numerator to obtain a voltage amplitude gradient for the three neighboring antenna loops $X_{p-1}$, $X_p$, and $X_{p+1}$. Third, multiplying the voltage amplitude gradient to a standard resolution constant $K_r$ to obtain an x-axis relative coordinate $X_r$, wherein the standard resolution constant $K_r$ is defined as the resolution within a single antenna loop which is a one inch expected resolution point divided by the number of antennas within one inch. The standard resolution constant $K_r$ is normally stored in the micro-processing sub-circuitry 215. Thus, the x-axis relative coordinate $X_r$ of the present invention is calculated by the following formula:

$$Xr = \frac{(X_{\max} - X_{2nd})}{(X_{\max} - X_{2nd}) + (X_{\max} - X_{3rd})} \times Kr$$

Moreover, the x-axis relative coordinate $X_r$ is a relative coordinate calculated from the partial scanning of the three neighboring antenna loops $X_{p-1}$, $X_p$, and $X_{p+1}$. Therefore, the x-axis relative coordinate $X_r$ needs to be transferred to a real x-axis absolute coordinate $X_a$. A second calculation procedure 280G is then used to calculate the x-axis absolute coordinate $X_a$ which sums up the relative coordinate $X_r$ and a fundamental coordinate value $X_{base}$. That is:

$$Xa = Xr + X_{base} \text{ where } X_{base} = (X_{top}-1) \times Kr$$

In accordance with the above description, an example of coordinate calculation procedure of the present invention is: taking (X1,X2,X3,X4,X5) to be (30,60,85,70,45), the respective antenna label of (X1,X2,X3,X4,X5) are (6,7,8,9, 10) and $K_r$=100; then $X_{top}$=8, $X_{max}$=85, $X_{2nd}$=70, $X_{3rd}$=60; Therefore $$Xr = \frac{(85-70)}{(85-60)+(85-70)} \times 100 = 37.5,$$

$X_{base}$=(8–1)×100=700, and $X_a$=700+37.5=737.5

Figure 2G:
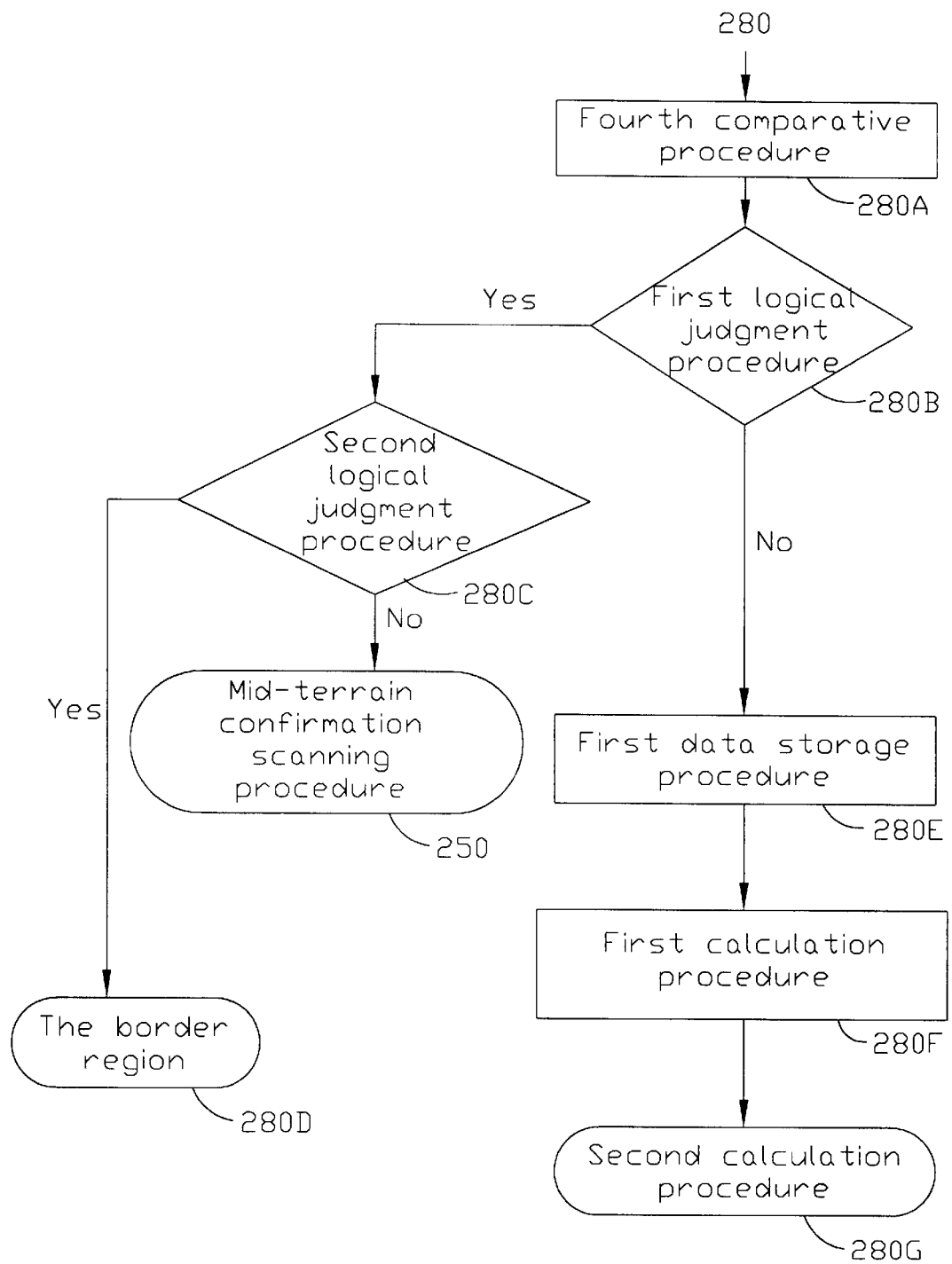
FIG. 2G depicts an x-axis coordinate positioning flowchart of the coordinate positioning method of the electromagnetic induction system of the preferred embodiment of the present invention.
Figure 2H:
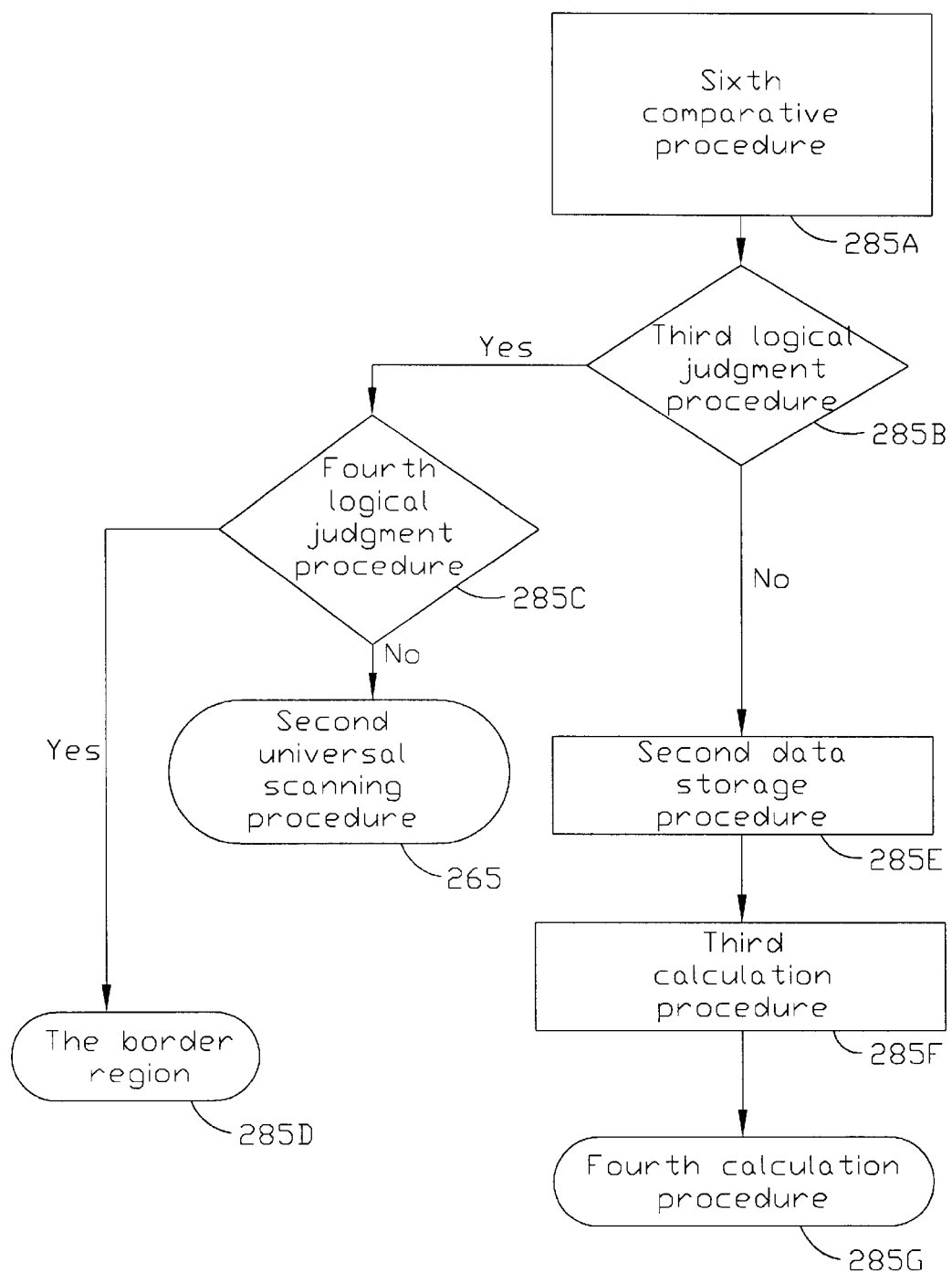
FIG. 2H depicts a y-axis coordinate positioning flowchart of the coordinate positioning method of the electromagnetic induction system of the preferred embodiment of the present invention.

Referring now to FIG. 2G, in the preferred embodiment of the present invention, Accordingly, the y-axis coordinate positioning procedure 285 comprises: first, carrying out a sixth comparative procedure 285A to compare among the signal amplitudes stored in the temporary storage Y1, Y2, Y3, Y4, and Y5 and store the largest amplitude into a temporary storage $Y_{max}$ and its antenna loop label into temporary storage $Y_{top}$. Second, carrying out a third logical judgment procedure 285B to judge the largest amplitude within the voltage amplitudes stored in the temporary storage Y1, Y2, Y3, Y4, and Y5. If the largest voltage amplitude is stored in temporary storage Y1 or Y5, then carry out a fourth logical judgment procedure 285C to find out whether or not the antenna loop position respective to temporary storage Y1 or Y5 is the first or the $M_{th}$ antenna loop of the y-axis antenna group 220B. If it is, one can conclude that the transmission source is located on the border region 285D of the y-axis antenna group 220B. If it is not, needs to return to the second universal scanning procedure 265. When the largest voltage amplitude is not stored in temporary storage Y1 or Y5, then carry out a second data storage procedure 285E for the ease of storing the second and third largest voltage amplitude into temporary storage $Y_{2nd}$ and $Y_{3rd}$ respectively. For example, the amplitudes of the neighboring two antenna loops $Y_{p-1}$ and $Y_{p-1}$ of the largest amplitude antenna loop $Y_p$ are stored in temporary storage $Y_{2nd}$ and $Y_{3rd}$ respectively.

Next, by means of the micro-processing sub-circuitry 215 carries out a third calculation procedure 285F which includes: first, subtracting the second largest value $Y_{2nd}$ and the third largest value $Y_{3rd}$ from the largest value $Y_{max}$ separately to obtain a third voltage amplitude difference $(Y_{max}-Y_{2nd})$ and a fourth voltage amplitude difference $(Y_{max}-Y_{3rd})$. Second, taking the sum of the third voltage amplitude difference $(Y_{max}-Y_{2nd})$ and the fourth voltage amplitude difference $(Y_{max}-Y_{3rd})$ as a denominator and the third voltage amplitude difference $(Y_{max}-Y_{2nd})$ as a numerator to obtain a voltage amplitude gradient for the three neighboring antenna loops $Y_{p-1}$, $Y_p$, and $Y_{p-1}$. Third, multiplying the voltage amplitude gradient to the standard resolution constant $K_r$ to obtain a y-axis relative coordinate $Y_r$. Thus, the y-axis relative coordinate $Y_r$ of the present invention is calculated by the following formula:

$$Yr = \frac{(Y_{\max} - Y_{2nd})}{(Y_{\max} - Y_{2nd}) + (Y_{\max} - Y_{3rd})} \times Kr$$

Finally, a fourth calculation procedure 285G is used to calculate the y-axis absolute coordinate $Y_a$ which sums up the relative coordinate $Y_r$ and a fundamental coordinate value $Y_{base}$. That is:

$Ya = Yr + Y_{base}$, 且 $Y_{base} = (Y_{top}-1) \times Kr$

Although a specific embodiment has been illustrated and described, it will be obvious to those skilled in the art that various modifications may be made without departing from what is intended to be limited solely by the appended claims.

Obviously, many modifications and variations of the present invention are possible in light of the above teachings. It is therefore to be understood that within the scope of the appended claims, the present invention may be practiced otherwise than as specifically described herein.

What is claimed is:

1. A coordinate positioning method for electromagnetic-induction systems, said coordinate positioning method comprising:
   providing an antenna layout, said antenna layout comprises a plurality of antenna loops;
   carrying out a first scanning procedure for scanning said plurality of antenna loops, and obtaining a largest voltage amplitude as well as an antenna position for providing said largest voltage amplitude from said plurality of antenna loops, said largest voltage amplitude is greater than a standard minimum signal recognition value;
   taking said antenna position as a center of scanning to proceed a second scanning procedure for scanning said antenna loops at said antenna position and said antenna position's neighboring positions, thus obtaining at least three voltage amplitudes; and
   taking said at least three voltage amplitudes to proceed a coordinate calculating procedure for obtaining a coordinate value.

2. The coordinate positioning method according to claim 1, wherein said antenna layout further comprises a plurality of antenna groups in different coordinate axis.

3. The coordinate positioning method according to claim 1, wherein said antenna layout further comprises a 4-4 distributed antenna layout.

4. The coordinate positioning method according to claim 3, wherein said 4-4 distribution antenna layout comprises an x-axis antenna group and a y-axis antenna group.

5. The coordinate positioning method according to claim 4, wherein said x-axis antenna group and said y-axis antenna group each comprises a plurality of antenna circuitries in equal distance displacements and in the same direction.

6. The coordinate positioning method according to claim 5, wherein said plurality of antenna circuitries comprises said plurality of antenna loops.

7. The coordinate positioning method according to claim 6, wherein the formation of said antenna loops comprises a dense multiple duplicate self-looping method.

8. The coordinate positioning method according to claim 1, wherein said first scanning procedure is proceeded by using time-division method.

9. The coordinate positioning method according to claim 1, wherein said first scanning procedure further comprises:
   activating and deactivating said plurality of antenna loops sequentially and obtaining a plurality of said voltage amplitudes from said plurality of antenna loops accordingly;
   comparing said plurality of said voltage amplitudes from said plurality of antenna loops to said standard minimum signal recognition value; and
   comparing among said voltage amplitudes which are greater than said standard minimum signal recognition value, thus obtaining said largest voltage amplitude as well as said antenna position for providing said largest voltage amplitude.

10. The coordinate positioning method according to claim 1, wherein said first scanning procedure further comprises a confirmation scanning procedure.

11. The coordinate positioning method according to claim 10, wherein said confirmation scanning procedure comprises:
   taking said antenna position as a center of scanning and scanning a half of said plurality of antenna loops sequentially for obtaining said plurality of voltage amplitudes of said half of said plurality of antenna loops; and
   comparing said plurality of voltage amplitudes of said half of said plurality of antenna loops to said standard minimum signal recognition value for obtaining the largest voltage amplitude of said plurality of voltage amplitudes as well as said antenna position for providing said largest voltage amplitude.

12. The coordinate positioning method according to claim 1, wherein said coordinate calculating procedure comprises a logical judgment procedure for discriminating the source of signal transmission in a border region of said antenna layout.

13. The coordinate positioning method according to claim 1, wherein said coordinate calculating procedure comprises a calculation step, said calculation step is used to calculate the differences between said largest voltage amplitude and the voltage amplitudes of neighboring antenna loops.

14. An antenna layout method for electromagnetic-induction systems, said antenna layout method comprising:
   providing a plurality of antenna loops;

using said plurality of antenna loops to form a plurality of antenna circuitries, wherein each of said plurality of antenna circuitries comprises four antenna loops;

using said plurality of antenna circuitries to form a plurality of antenna groups in different directions, wherein each of said plurality of antenna groups in different directions comprises one antenna loop; and placing said plurality of antenna groups of different directions into an antenna sub-circuitry of said electromagnetic-induction system in an equal spacing manner for forming said antenna layout of said electromagnetic-induction system.

15. The antenna layout method according to claim 14, wherein the material of said plurality of antenna loops comprises copper foil conducting wire.

16. The antenna layout method according to claim 14, wherein said plurality of antenna loops further comprises a multiple looping induction antenna.

17. The antenna layout method according to claim 16, wherein said multiple looping induction antenna is formed by a dense multiple duplicate self-looping method.

18. The antenna layout method according to claim 16, wherein said multiple looping induction antenna further comprises a four-looping type induction antenna.

19. The antenna layout method according to claim 14, wherein each of said antenna circuitries can receive an electromagnetic-induction signal from a signal transmission source through at least three of said antenna loops.

20. The antenna layout method according to claim 14, wherein the allocation of said plurality of antenna loops of each of said antenna groups is in equal distance displacements and in the same direction.

21. The antenna layout method according to claim 20, wherein the layout method of said antenna groups comprises a two-dimensional array allocation method.

22. The antenna layout method according to claim 21, wherein the coordinating method of said two-dimensional array allocation method further comprises a two-dimensional Cartesian coordinate.

23. A five-stage coordinate positioning method of electromagnetic-induction systems, said five-stage coordinate positioning method comprising:

carrying out a first universal scanning procedure for scanning an universal antenna group of having a first coordinate direction, and obtaining a first largest voltage amplitude of each antenna signal accordingly;

using a micro-processing sub-circuitry to carry out a first comparative procedure for comparing said first largest voltage amplitude to a standard minimum signal recognition value, and confirming a first antenna position of having said first largest voltage amplitude greater than said standard minimum signal recognition value;

using said first antenna position as a first scanning basis to proceed a mid-terrain confirmation scanning procedure for scanning said antenna group having said first coordinate direction in a half region, thus obtaining a plurality of second largest voltage amplitudes within said half region;

using said micro-processing sub-circuitry to carry out a second comparative procedure for comparing said second largest voltage amplitudes to said standard minimum signal recognition value, and reconfirming a second antenna position of having said second largest voltage amplitude greater than said standard minimum signal recognition value;

using said second antenna position as a second scanning basis to proceed a first partial confirmation scanning procedure for scanning said antenna group having said first coordinate direction in a first partial region, thus obtaining a plurality of third largest voltage amplitudes within said first partial region;

carrying out a second universal scanning procedure for scanning an universal antenna group of having a second coordinate direction, and obtaining a fourth largest voltage amplitude of each antenna signal accordingly;

using said micro-processing sub-circuitry to carry out a third comparative procedure for comparing among said fourth largest voltage amplitudes, and obtaining a third antenna position of having the largest voltage amplitude;

using said third antenna position as a second scanning basis to proceed a second partial confirmation scanning procedure for scanning said antenna group having said second coordinate direction in a second partial region, thus obtaining a plurality of fifth largest voltage amplitudes within said second partial region;

using said second antenna position and said plurality of third largest voltage amplitudes to proceed a first coordinate positioning procedure for obtaining a first coordinate value of said first coordinate direction; and using said third antenna position and said plurality of fifth largest voltage amplitudes to proceed a second coordinate positioning procedure for obtaining a second coordinate value of said second coordinate direction.

24. The five-stage coordinate positioning method according to claim 23, wherein said first universal scanning procedure is accomplished by using a time-division basis method to scan said antenna groups of having said first coordinate direction.

25. The five-stage coordinate positioning method according to claim 24, wherein said time-division basis method is to activate one antenna loop at a time and keep the remaining antenna loops deactivated or open-circuited.

26. The five-stage coordinate positioning method according to claim 23, wherein the scanning coverage of said first partial confirmation scanning procedure includes said second antenna position and four other closest antenna positions.

27. The five-stage coordinate positioning method according to claim 23, wherein said second universal scanning procedure is accomplished by using a time-division basis method to scan said antenna groups of having said second coordinate direction.

28. The five-stage coordinate positioning method according to claim 27, wherein said time-division basis method is to activate one antenna loop at a time and keep the remaining antenna loops deactivated or open-circuited.

29. The five-stage coordinate positioning method according to claim 23, wherein the scanning coverage of said second partial confirmation scanning procedure includes said third antenna position and four other closest antenna positions.

30. The five-stage coordinate positioning method according to claim 23, wherein said first coordinate positioning procedure further comprises:

using said plurality of third largest voltage amplitudes to proceed a fourth comparative procedure for obtaining a sixth largest voltage amplitude and a fourth antenna position accordingly;

using said fourth antenna position and said sixth largest voltage amplitude to proceed a first logical judgment procedure for discriminating said fourth antenna position in an ex-border region of said antenna group in said first coordinate direction;

using said sixth largest voltage amplitude and a seventh and eighth largest voltage amplitude of neighboring said fourth antenna position to proceed a first calculation procedure for obtaining a first coordinate value of said first coordinate direction; and using said first coordinate value to proceed a second calculation procedure for obtaining a first absolute coordinate value of said first coordinate direction.

31. The five-stage coordinate positioning method according to claim 30, wherein said first logical judgment procedure once judged said fourth antenna position is within the border region of said antenna group of having said first coordinate direction, then the source of signal transmission is within the border region of said electromagnetic-induction system.

32. The five-stage coordinate positioning method according to claim 30, wherein said first calculation procedure further comprises:

using said sixth largest voltage amplitude and said seventh largest voltage amplitude to proceed a first subtraction for obtaining a first voltage amplitude difference;

using said sixth largest voltage amplitude and said eighth largest voltage amplitude to proceed a second subtraction for obtaining a second voltage amplitude difference;

taking the sum of said first voltage amplitude difference and said second voltage amplitude difference as a denominator and said first voltage amplitude difference as a numerator to proceed a first division for obtaining a first voltage amplitude gradient; and using said first voltage amplitude gradient and a standard resolution constant to proceed a first multiplication for obtaining a first relative coordinate value.

33. The five-stage coordinate positioning method according to claim 32, wherein said standard resolution constant is the coordinate points within every constant distance.

34. The five-stage coordinate positioning method according to claim 30, wherein said first absolute coordinate value is the sum of said first relative coordinate value and a first fundamental coordinate value.

35. The five-stage coordinate positioning method according to claim 34, wherein the calculation method of said first fundamental coordinate value comprises:

subtracting one from said fourth antenna position for obtaining a first difference; and multiplying said first difference and said standard resolution constant to obtain said first fundamental coordinate value.

36. The five-stage coordinate positioning method according to claim 23, wherein said second coordinate positioning procedure further comprises:

using said plurality of fifth largest voltage amplitudes to proceed a fifth comparative procedure for obtaining a ninth largest voltage amplitude and a fifth antenna position accordingly;

using said fifth antenna position and said ninth largest voltage amplitude to proceed a second logical judgment procedure for discriminating said fifth antenna position in an ex-border region of said antenna group in said second coordinate direction;

using said ninth largest voltage amplitude and a tenth and eleventh largest voltage amplitude of neighboring said fifth antenna position to proceed a third calculation procedure for obtaining a second coordinate value of said second coordinate direction; and using said second coordinate value to proceed a fourth calculation procedure for obtaining a second absolute coordinate value of said second coordinate direction.

37. The five-stage coordinate positioning method according to claim 36, wherein said second logical judgment procedure once judged said fifth antenna position is within the border region of said antenna group of having said second coordinate direction, then the source of signal transmission is within the border region of said electromagnetic-induction system.

38. The five-stage coordinate positioning method according to claim 36, wherein said third calculation procedure further comprises:

using said ninth largest voltage amplitude and said tenth largest voltage amplitude to proceed a third subtraction for obtaining a third voltage amplitude difference;

using said ninth largest voltage amplitude and said eleventh largest voltage amplitude to proceed a fourth subtraction for obtaining a fourth voltage amplitude difference;

taking the sum of said third voltage amplitude difference and said fourth voltage amplitude difference as a denominator and said third voltage amplitude difference as a numerator to proceed a second division for obtaining a second voltage amplitude gradient; and using said second voltage amplitude gradient and a standard resolution constant to proceed a second multiplication for obtaining said second relative coordinate value.

39. The five-stage coordinate positioning method according to claim 36, wherein said second absolute coordinate value is the sum of said second relative coordinate value and a second fundamental coordinate value.

40. The five-stage coordinate positioning method according to claim 39, wherein the calculation method of said second fundamental coordinate value comprises:

subtracting one from said fifth antenna position for obtaining a second difference; and multiplying said second difference and said standard resolution constant to obtain said second fundamental coordinate value.

41. A five-stage coordinate positioning method of electromagnetic-induction systems, said five-stage coordinate positioning method comprising:

providing a 4-4 distribution antenna layout, said 4-4 distribution antenna layout comprising a x-axis antenna group and a y-axis antenna group;

carrying out a x-axis universal scanning procedure for scanning a plurality of antenna loops within said x-axis antenna group on a time-division basis, and obtaining a plurality of first voltage amplitude;

using a micro-processing sub-circuitry to carry out a first comparative procedure for comparing each of said first voltage amplitude to a standard minimum signal recognition value, thus obtaining a first antenna position of having a first largest voltage amplitude greater than said standard minimum signal recognition value;

using said first antenna position as the center of scanning to proceed a x-axis mid-terrain confirmation scanning procedure for scanning a half of said antenna loops within said x-axis antenna group, and obtaining a plurality of second voltage amplitudes;

using said micro-processing sub-circuitry to carry out a second comparative procedure for comparing each of said second voltage amplitudes to said standard minimum signal recognition value, thus obtaining a second antenna position of having a second largest voltage amplitude greater than said standard minimum signal recognition value;

using said second antenna position as the center of scanning to proceed a x-axis partial confirmation scanning procedure for scanning said second antenna position and four other antennas neighboring said second antenna position, thus obtaining five third voltage amplitudes and the relative antenna positions;

carrying out a y-axis universal scanning procedure for scanning another plurality of antenna loops within said y-axis antenna group on a time-division basis, and obtaining a plurality of fourth voltage amplitude;

using said micro-processing sub-circuitry to carry out a third comparative procedure for comparing among said fourth voltage amplitudes, thus obtaining a third antenna position of having a fourth largest voltage amplitude;

using said third antenna position as the center of scanning to proceed a y-axis partial confirmation scanning procedure for scanning said third antenna position and four other antennas neighboring said third antenna position, thus obtaining five fifth voltage amplitudes and the relative antenna positions;

using said second antenna position and said five third voltage amplitudes to proceed a fourth comparative procedure for obtaining first, second and third largest values of said five third voltage amplitudes, and a fourth antenna position of the largest value accordingly;

using the first, second and third largest values of said five third voltage amplitudes to proceed a first calculation procedure for obtaining a x-axis relative coordinate value;

using said fourth antenna position to proceed a second calculation procedure for obtaining a x-axis fundamental coordinate value;

using said x-axis relative coordinate value and said x-axis fundamental coordinate value to proceed a third calculation procedure for obtaining a x-axis absolute coordinate value;

using said second antenna position and said five fifth voltage amplitudes to proceed a fifth comparative procedure for obtaining first, second and third largest values of said five fifth voltage amplitudes, and a fifth antenna position of the largest value of said five fifth voltage amplitudes accordingly;

using the first, second and third largest values of said five fifth voltage amplitudes to proceed a fourth calculation procedure for obtaining a y-axis relative coordinate value;

using said fourth antenna position to proceed a fifth calculation procedure for obtaining a y-axis fundamental coordinate value; and using said y-axis relative coordinate value and said y-axis fundamental coordinate value to proceed a sixth calculation procedure for obtaining a y-axis absolute coordinate value.

42. The five-stage coordinate positioning method according to claim 41, wherein each of said antenna groups in the same direction comprises a plurality of antenna circuitries in equal distance displacements and in the same direction.

43. The five-stage coordinate positioning method according to claim 42, wherein each of said plurality of antenna circuitries in equal distance displacements and in the same direction comprises four antenna loops.

44. The five-stage coordinate positioning method according to claim 43, wherein each of said antenna loops can receive an electromagnetic-induction signal from a signal transmission source through at least three of said antenna loops.

45. The five-stage coordinate positioning method according to claim 43, wherein each of said antenna loops comprises a four-looping type induction antenna.

46. The five-stage coordinate positioning method according to claim 41, wherein said first comparative procedure further comprises a step of repeating said x-axis universal scanning procedure once all of said plurality of first voltage amplitudes are smaller than said standard minimum signal recognition value.

47. The five-stage coordinate positioning method according to claim 41, wherein said second comparative procedure further comprises a step of repeating said x-axis universal scanning procedure once all of said plurality of second voltage amplitudes are smaller than said standard minimum signal recognition value.

48. The five-stage coordinate positioning method according to claim 41, wherein said fourth comparative procedure comprises a first logic step.

49. The five-stage coordinate positioning method according to claim 48, wherein said first logic step is to judge a signal source to be located in a border region of said x-axis antenna group within said 4-4 distribution antenna layout when the antenna position of the largest value of said five third voltage amplitudes is the outermost antenna position.

50. The five-stage coordinate positioning method according to claim 48, wherein said first logic step carries out said first calculation procedure when the antenna position of the largest value of said five third voltage amplitudes is not the outermost antenna position.

51. The five-stage coordinate positioning method according to claim 41, wherein said first-calculation procedure comprises a standard resolution constant, said standard resolution constant is a one inch expected resolution point divided by the number of antennas within one inch.

52. The five-stage coordinate positioning method according to claim 41, wherein said second calculation procedure comprises a standard resolution constant.

53. The five-stage coordinate positioning method according to claim 41, wherein said x-axis absolute coordinate value is the sum of said x-axis relative coordinate value and said x-axis fundamental coordinate value.

54. The five-stage coordinate positioning method according to claim 41, wherein said fifth comparative procedure comprises a second logic step.

55. The five-stage coordinate positioning method according to claim 54, wherein said second logic step is to judge a signal source to be located in a border region of said y-axis antenna group within said 4-4 distribution antenna layout when the antenna position of the largest value of said five fifth voltage amplitudes is the outermost antenna position.

56. The five-stage coordinate positioning method according to claim 54, wherein said second logic step carries out said fourth calculation procedure when the antenna position of the largest value of said five fifth voltage amplitudes is not the outermost antenna position.

57. The five-stage coordinate positioning method according to claim 41, wherein said fourth calculation procedure comprises a standard resolution constant.

58. The five-stage coordinate positioning method according to claim 41, wherein said fifth calculation procedure comprises a standard resolution constant.

59. The five-stage coordinate positioning method according to claim 41, wherein said y-axis absolute coordinate value is the sum of said y-axis relative coordinate value and said y-axis fundamental coordinate value.

* * * * *